United States Patent
Block et al.

(10) Patent No.: US 8,111,920 B2
(45) Date of Patent: Feb. 7, 2012

(54) CLOSED-LOOP INTEGRITY MONITOR

(75) Inventors: Gerald J. Block, Vista, CA (US);
Delmar M. Fadden, Preston, WA (US)

(73) Assignee: Sandel Avionics, Inc., Vista, CA (US)

(*) Notice: Subject to any disclaimer, the term of this patent is extended or adjusted under 35 U.S.C. 154(b) by 1047 days.

(21) Appl. No.: 11/872,643

(22) Filed: Oct. 15, 2007

(65) Prior Publication Data

US 2008/0100611 A1    May 1, 2008

Related U.S. Application Data

(60) Provisional application No. 60/851,950, filed on Oct. 16, 2006, provisional application No. 60/852,246, filed on Oct. 16, 2006.

(51) Int. Cl.
*G06K 9/00* (2006.01)
(52) U.S. Cl. ...................................... 382/181
(58) Field of Classification Search ............ 382/103, 382/181, 209, 218
See application file for complete search history.

(56) References Cited

U.S. PATENT DOCUMENTS

| | | | | |
|---|---|---|---|---|
| 5,666,111 | A | * | 9/1997 | Servat et al. .................. 340/980 |
| 5,969,670 | A | * | 10/1999 | Kalafus et al. ........... 342/357.31 |
| 7,724,155 | B1 | * | 5/2010 | Anderson et al. ............. 340/975 |
| 7,724,259 | B2 | * | 5/2010 | Hedrick et al. ............... 345/501 |
| 2005/0288939 | A1 | | 12/2005 | Peled et al. |
| 2006/0001553 | A1 | | 1/2006 | Hedrick |
| 2006/0059253 | A1 | | 3/2006 | Goodman et al. |

* cited by examiner

*Primary Examiner* — Daniel Mariam
(74) *Attorney, Agent, or Firm* — Mark D. Wieczorek, Esq.; Mayer & Williams PC

(57) ABSTRACT

Systems and methods for operating an avionics component to a level of certification. Steps include: receiving and sending data to a data monitor and an integrity monitor, the data monitor operating at a first level of certification and the integrity monitor operating at a second higher level; using the integrity monitor, determining where a feature of the data should appear on a display; checking if the feature properly appears, and if not, an error condition appears. The system includes: a sensor for sensing an aircraft condition; a data monitor for receiving and rendering data from the sensor, the data monitor certified to a first category level; an integrity monitor for receiving the data from the sensor and for calculating where a feature of the data should appear on a data display, the integrity monitor certified to a second higher level. If the feature does not properly appear, an error condition appears.

21 Claims, 2 Drawing Sheets

CLOSED-LOOP INTEGRITY MONITOR

STATEMENT OF RELATED APPLICATIONS

This application claims the benefit of U.S. Provisional Patent Application Ser. No. 60/851,950, filed Oct. 16, 2006, entitled "Closed-Loop Integrity Monitor".

This application also claims the benefit of U.S. Provisional Patent Application Ser. No. 60/852,246, filed Oct. 16, 2006, entitled "Closed-Loop Integrity Monitor".

Both of the prior applications are incorporated herein by reference in their entireties.

BACKGROUND

Prior to the introduction of software to the cockpit suite, mechanical flight indicators were designed to fail in an obvious fashion. In this way, pilots would immediately notice their faulty character, and could take appropriate action. Current instruments, however, often include significant amounts of embedded software.

The Federal Aviation Administration has established strict guidelines regarding the allowance of embedded software in avionics instrumentation in aircraft, e.g., the standard DO-178B was established by the FAA's Advisory Circular AC20-115B. DO-178B established categories A-E into which instrumentation is classified. Category "A" corresponds to the most vital instrumentation, that whose failure is often catastrophic, e.g., altitude indicators, airspeed indicators, and attitude indicators. Category "B" corresponds to instrumentation whose failure is hazardous, and so on. Category "E" corresponds to instrumentation whose failure has virtually no effect.

The time and expense of certifying an instrument to a given level is proportional to the category: category "A" instruments require an elaborate and inordinate amount of time and expense to certify, while category "E" instruments require much less so, with the intermediate products in between. This is in many cases converse to the consideration of the level of complexity of the instrument: i.e., category "A" instruments typically deliver simple types of information, e.g., airspeed, attitude, etc., while lower category instruments deliver much more complex information, e.g., navigational displays.

There is currently a trend in avionics instrumentation to provide a cluster of instruments on a single large display. However, if the cluster includes instruments of more than one category, all instruments must be certified to the highest category. For complex, lower-category instruments, this may translate to an extraordinary amount of testing to certify a complex instrument to a category "A".

SUMMARY OF THE INVENTION

Systems and methods are provided for operating an avionics component to a given level of certification. Steps of the method include: receiving data from a sensor and sending the data to at least two components, a data monitor and an integrity monitor, the data monitor operating at a first level of certification and the integrity monitor operating at a second level of certification, the second level higher than the first level; rendering the data sent to the data monitor on a data display; using the integrity monitor, determining where at least one feature of the rendered data should appear on the data display; checking if the at least one feature of the rendered data properly appears on the data display, and if it does not, causing an error condition to appear on the data display. The system includes: a sensor for sensing a condition of an aircraft; a data monitor for receiving data from the sensor and for at least rendering the data such that the data may be graphically displayed on a data display, the data monitor certified to a first category level; an integrity monitor for receiving the same data from the sensor as the data monitor and for calculating from the data where at least one feature of the rendered data should appear on the data display, the integrity monitor certified to a second category level, the second category level higher than the first category level, such that if the at least one feature of the rendered data does not appear on the data display at a proper location, the integrity monitor causes an error condition to appear on the data display.

It is noted that in certain embodiments the given level of certification desired may be higher than either of that of the data monitor or that of the integrity monitor. However, the combination of the certification levels of the data monitor and the integrity monitor may result in a higher certification level, such as the desired given certification level.

In one aspect, the invention is directed to a method of operating an avionics component to a given level of certification. Steps include: receiving data from a sensor and sending the data to at least two components, a data monitor and an integrity monitor, the data monitor operating at a first level of certification and the integrity monitor operating at a second level of certification, the second level higher than the first level; rendering the data sent to the data monitor on a data display; using the integrity monitor, determining where at least one feature of the rendered data should appear on the data display; checking if the at least one feature of the rendered data properly appears on the data display, and if it does not, causing an error condition to appear on the data display.

In another aspect, the invention is directed to an avionics component, including: a sensor for sensing a condition of an aircraft; a data monitor for receiving data from the sensor and for at least rendering the data such that the data may be graphically displayed on a data display, the data monitor certified to a first category level; an integrity monitor for receiving the same data from the sensor as the data monitor and for calculating from the data where at least one feature of the rendered data should appear on the data display, the integrity monitor certified to a second category level, the second category level higher than the first category level, such that if the at least one feature of the rendered data does not appear on the data display at a proper location, the integrity monitor causes an error condition to appear on the data display.

Implementations of the invention may include one or more of the following. The checking may be performed by a pixel sniffer, such as one employing pixel decimation or color range comparison. The comparison made by, e.g., the pixel sniffer, may be to a specified level of tolerance, such as 90%, 95%, and so on. The error condition may be such that a flag appears on the screen or that a blank screen appears. The sensor, data, data monitor, and data display may be, e.g., an altimeter, an airspeed indicator, or an attitude indicator. If the instrument is an attitude indicator, the at least one feature of the rendered data may correspond to at least two points on a horizon line. If the instrument is an airspeed indicator or an altimeter, the at least one feature of the rendered data may correspond to numerals of a numeric display. The second level of certification may be category A, and the first level of certification may be category C. The integrity monitor may be structured and configured to check the integrity of a plurality of data monitors.

In another aspect, the invention is directed to a computer-readable medium containing instructions for causing a computer to execute the method.

DESCRIPTION

In this description, for exemplary purposes only, an attitude monitor is described. Such a monitor requires a category A certification. The display for this attitude monitor is designed, according to embodiments of the invention, to require a lesser certification, e.g., a category C certification. However, it should be noted that the invention is much broader than this embodiment. In particular, the invention may be employed to lessen the display categorization needed for any given device, and to any desired level of certification. In most cases, this will mean lessening an A or B certification to a lower category, such as a C. Typical category A devices to which the invention will apply may be monitors of attitude, altitude, or airspeed.

Moreover, neither the data monitor nor the integrity monitor need necessarily to be certified to the desired given certification level—rather, their combination may result in the desired certification level.

The present invention employs a particular variety of redundant monitor, herein termed an integrity monitor, to check the status of another device. The integrity monitor is certified to the highest category required, either due to its type or due to the type of other devices in the cluster in which it sits. Thus, to certify a class A device, such as the monitors above, the integrity monitor must be certified to class A, or the combination of the data monitor and the integrity monitor should be certified to class A.

Figure 1:
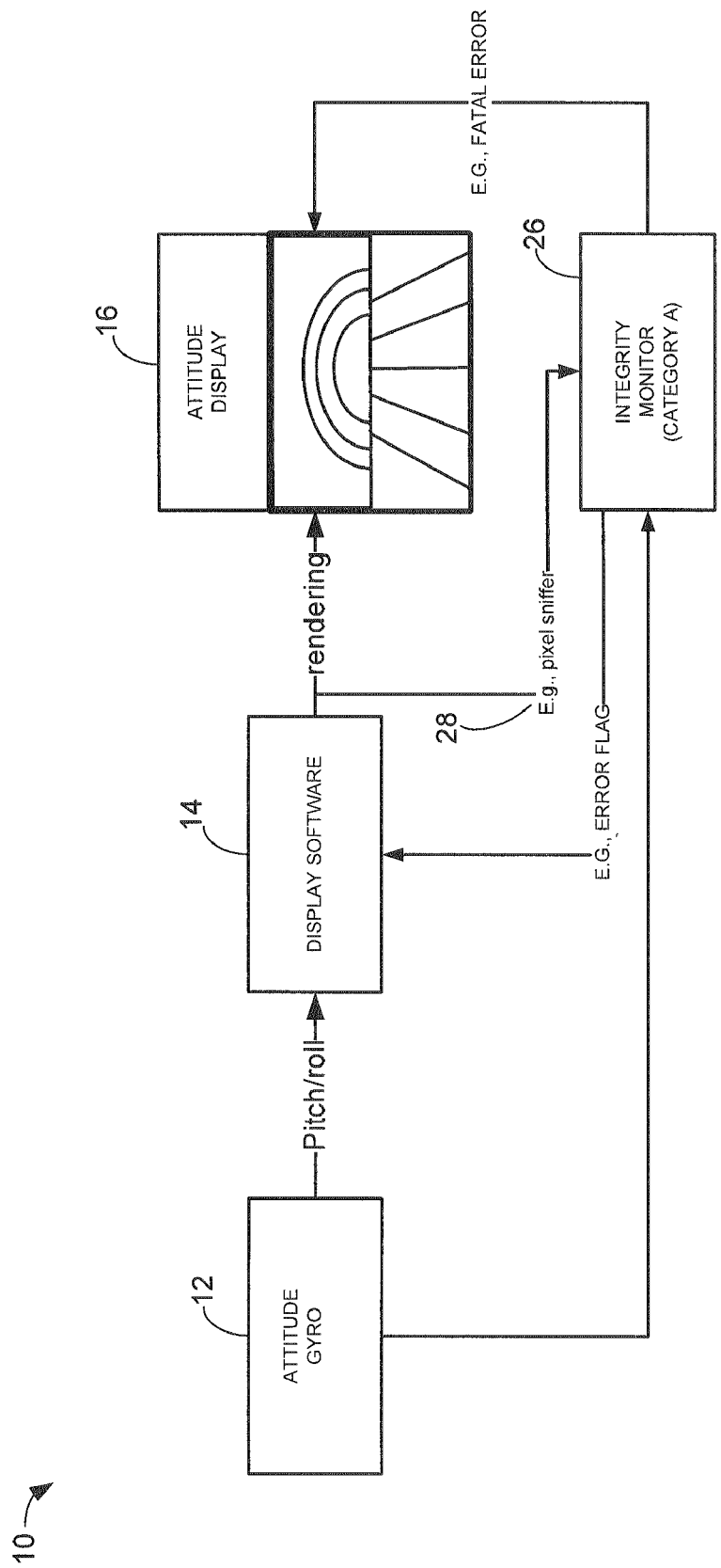
FIG. 1 shows a schematic diagram of a closed-loop integrity monitor according to an embodiment of the invention.
Figure 2:
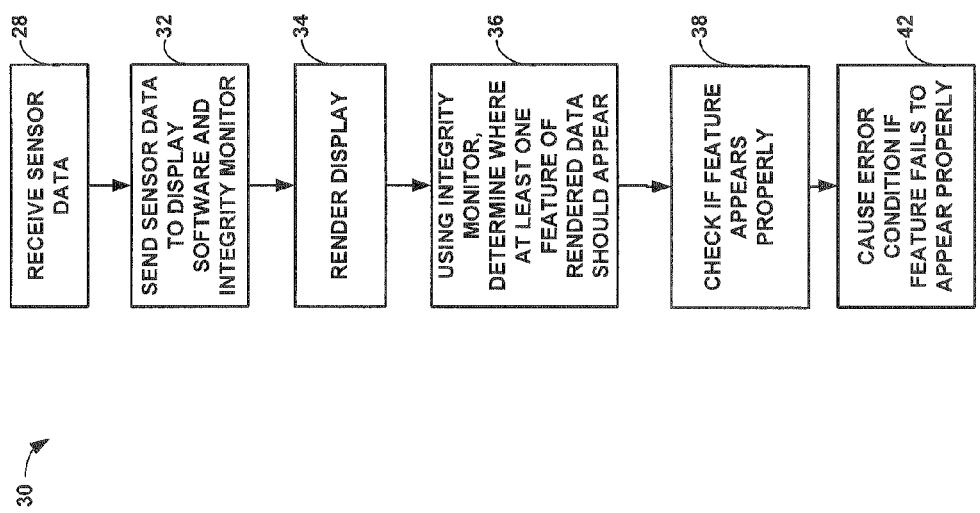
FIG. 2 shows a flowchart of a method of the invention.

FIG. 1 shows the system 10 and FIG. 2 shows the method 30. As shown in FIG. 1, an attitude gyro 12, shown for exemplary purposes only, creates data from its incorporated sensor (step 28) sends its sensed data (step 32) such as pitch and roll to display software 14. The sensor, display software, and display have been, in this exemplary embodiment, certified to, e.g., a category C level. This is two levels less than a typical attitude monitor. The display software 14 then causes the pitch and roll data to be displayed graphically on the attitude display 16 (step 34).

The attitude gyro 12 also sends a parallel set of data (step 32) to an integrity monitor 26, which has been certified to, e.g., a category A level. The integrity monitor 26 may exist entirely in software, hardware, or a combination of both, and typically has no separate display associated therewith.

The integrity monitor 26 thus receives data from a device sensor (in FIG. 1, gyro 12) and determines how a feature of a display corresponding to that data should appear (step 36). As an example, for an attitude display, the integrity monitor may calculate and thus determine where the line ends of the horizon line should appear. In another embodiment, any two points of the horizon line may be employed. Using a "pixel sniffer" and checking the data corresponding to the rendered signal (using, e.g., the "pixel sniffer" data communication line 28 shown in the figure), the integrity monitor 26 may check, to a given category certification level, if the attitude display 16 is showing what it should (step 38). If it is not, an error condition may be output to the attitude display, e.g., a red flag may appear, or the screen may be made blank (such as via shutting off a back light, or even cutting off power to the device). In some cases, a flag or blank screen may alternately appear, depending on the severity of the malfunction. Upon causing a flag to appear, or other error condition, the integrity monitor may then check that the error condition is appearing on the display, and a more severe indication may be given upon recognition that the error condition is not displaying properly.

Other error indications may be used, so long as the pilot is immediately notified that attention is necessary because a device has been lost (step 42). Generally, the error condition should be such that the error is obvious to the pilot, as opposed to a more subtle indication.

In many cases a pixel sniffer is dedicated to just one device. However, in some cases, multiple pixel sniffers may send data, e.g., in alternating time frames, to one integrity monitor, to allow multiple devices to be checked with just one integrity monitor.

Besides the line ends as disclosed above, any other part of the line may be checked for integrity and certification. For airspeed or altitude indicators, the "pixel sniffer" may check a numeric display, such as using correlator functionality, to check if the display is displaying the proper set of numerals (sensed data values) corresponding to the measured sensor data. Such functionality may be enhanced by more detailed knowledge of the display, e.g., the fonts used. The system and method may allow that a match be defined at any specified level of tolerance, such as if over 90% of pixels match. In addition to checking lines and numerals, the system and method may also provide for a check for shapes, such as by comparing to known or expected shapes.

In any case, the pixel sniffer may employ techniques such as pixel decimation and color range comparison.

In this way, all of the benefits of a category A device are obtained, while the more complicated graphical display need be certified only to a lesser category level.

Of course, various aspects, components, or steps of the embodiments described above may be replaced with others and still fall within the scope of the invention. For example, the pixel sniffer may be replaced with any data analyzer that can determine if a particular pixel or group of pixels is a particular color or at a particular state of activation. The attitude monitor described may be replaced by, or accompanied by, any other type of device, such as are named above. Therefore, the scope of the invention is to be limited solely by the claims appended here.

The invention claimed is:

1. A method of operating an avionics component to a given level of certification, comprising:
   a. receiving data from a sensor and sending the data to at least two components, a data monitor and an integrity monitor, the data monitor operating at a first level of certification and the integrity monitor operating at a second level of certification, the first and second levels of certification each below the given level of certification, and wherein the combination of the first level of certification and the second level of certification result in the given level of certification;
   b. rendering the data sent to the data monitor on a data display;
   c. using the integrity monitor, determining where at least one feature of the rendered data should appear on the data display within a specified level of tolerance;
   d. checking if the at least one feature of the rendered data properly appears on the data display, and if it does not, causing an error condition to appear on the data display.

2. The method of claim 1, wherein the error condition is a flag or a blank screen.

3. The method of claim 1, wherein the checking is performed by a pixel sniffer.

4. The method of claim 3, wherein the pixel sniffer employs color range comparison.

5. The method of claim 3, wherein the pixel sniffer employs pixel decimation.

6. The method of claim 1, wherein the causing causes a blank screen to appear.

7. The method of claim 1, wherein the sensor, data, data monitor, and data display corresponds to a device selected from the group consisting of: an altimeter, an airspeed indicator, and an attitude indicator.

8. The method of claim 7, wherein the device is an attitude indicator, and the at least one feature of the rendered data corresponds to the location of at least one pixel of a horizon line.

9. The method of claim 7, wherein the device is an airspeed indicator or an altimeter, and the at least one feature of the rendered data corresponds to numerals of a numeric display.

10. The method of claim 1, wherein the integrity monitor is structured and configured to check the integrity of a plurality of data monitors.

11. A non-transitory computer-readable medium containing instructions for causing a computer to execute the method of claim 1.

12. An avionics component certified to a given category level, comprising:
   a. a sensor for sensing a condition of an aircraft;
   b. a data monitor for receiving data from the sensor and for at least rendering the data such that the data may be graphically displayed on a data display, the data monitor certified to a first category level;
   c. an integrity monitor for receiving the same data from the sensor as the data monitor and for calculating from the data where at least one feature of the rendered data should appear on the data display, the integrity monitor certified to a second category level, the first and second category levels each below the given level of certification, and wherein the combination of the first category level and the second category level result in the given level of certification;
   d. such that if the at least one feature of the rendered data does not appear on the data display at a proper location, the integrity monitor causes an error condition to appear on the data display.

13. The component of claim 12, wherein the error condition is a flag or a blank screen.

14. The component of claim 12, wherein the integrity monitor includes a pixel sniffer.

15. The component of claim 12, wherein the error condition is a blank screen.

16. The component of claim 12, wherein the sensor, data, data monitor, and data display corresponds to a device selected from the group consisting of: an altimeter, an airspeed indicator, and an attitude indicator.

17. The component of claim 16, wherein the device is an attitude indicator, and the at least one feature of the rendered data corresponds to the location of at least one pixel of a horizon line.

18. The component of claim 16, wherein the device is an airspeed indicator or an altimeter, and the at least one feature of the rendered data corresponds to numerals of a numeric display.

19. The component of claim 12, wherein the integrity monitor is structured and configured to check the integrity of a plurality of data monitors.

20. The component of claim 12, wherein the pixel sniffer employs pixel decimation.

21. The component of claim 12, wherein the pixel sniffer employs color range comparison.

* * * * *